United States Patent
Jordens et al.

(10) Patent No.: US 12,187,963 B2
(45) Date of Patent: Jan. 7, 2025

(54) METHOD FOR STEAM CRACKING

(71) Applicants: BASF ANTWERPEN N.V., Antwerp (BE); BOREALIS A.G., Vienna (AT); SABIC GLOBAL TECHNOLOGIES B.V., PX Bergen op Zoom (NL); TotalEnergies OneTech Belgium, Seneffe (BE); BASELL POLYOLEFINE GMBH, Wesseling (DE)

(72) Inventors: Marc Jozef Maria Jordens, Nijlen (BE); Nikolaos Vavizos, Vienna (AT); Walter Josephus Vermeiren, Houthalen (BE); Martin Leinz, Essen (DE); Paulus Maria Brandts, Limbricht (NL); Eric Simon Petrus Appelman, Dordrecht (NL); Michael Pohl, Oppenheim (DE); Christian Barreau, La Barben (FR); Jens Becker, Cologne (DE)

(73) Assignees: BASF ANTWERPEN N.V., Antwerp (BE); BOREALIS A.G., Vienna (AT); SABIC GLOBAL TECHNOLOGIES B.V., PX Bergen op Zoom (NL); TotalEnergies OneTech Belgium, Seneffe (BE); BASELL POL YOLEFINE GMBH, Wesseling (DE)

( * ) Notice: Subject to any disclaimer, the term of this patent is extended or adjusted under 35 U.S.C. 154(b) by 83 days.

(21) Appl. No.: 18/015,216

(22) PCT Filed: Jul. 9, 2020

(86) PCT No.: PCT/EP2020/069324
§ 371 (c)(1),
(2) Date: Jan. 9, 2023

(87) PCT Pub. No.: WO2022/008053
PCT Pub. Date: Jan. 13, 2022

(65) Prior Publication Data
US 2023/0133789 A1    May 4, 2023

(51) Int. Cl.
*C10G 15/08* (2006.01)
*C10G 9/20* (2006.01)
*C10G 9/24* (2006.01)
*C10G 9/36* (2006.01)

(52) U.S. Cl.
CPC ............. *C10G 15/08* (2013.01); *C10G 9/206* (2013.01); *C10G 9/24* (2013.01); *C10G 9/36* (2013.01); *C10G 2300/4006* (2013.01); *C10G 2400/20* (2013.01)

(58) Field of Classification Search
CPC .......... C10G 15/08; C10G 9/206; C10G 9/24; C10G 9/36; C10G 2300/4006; C10G 2400/20; Y02P 30/00
See application file for complete search history.

(56) References Cited

U.S. PATENT DOCUMENTS

2006/0116543 A1   6/2006   Bellet et al.
2009/0012340 A1*  1/2009   Choi ..................... C10G 11/04
                                                    585/653

FOREIGN PATENT DOCUMENTS

| CN | 104371754 A | 2/2015 |
| EP | 3249027 A1 | 7/2016 |
| EP | 3730592 A1 * | 10/2020 |
| GB | 1269311 A | 4/1972 |
| WO | WO-2021094346 A1 * | 5/2021 .......... B01J 19/2485 |

OTHER PUBLICATIONS

Patent Cooperation Treaty, International Search Report, Application No. PCT/EP2020/069324, dated Mar. 8, 2021, in 3 pages.

* cited by examiner

*Primary Examiner* — Randy Boyer
*Assistant Examiner* — Juan C Valencia
(74) *Attorney, Agent, or Firm* — Procopio, Cory, Hargreaves & Savitch LLP

(57) ABSTRACT

The present application relates to a process for cracking a hydrocarbon feedstock, using to the largest extent electrically powered equipment where the power is obtained from renewable sources or low-carbon sources. In particular, it relates to a furnace for steam cracking a hydrocarbon feedstock, wherein the furnace comprises one or more tubes for transporting the hydrocarbon feedstock and dilution steam; and an electrically heated infrared emitter for transferring heat to the tubes. It also relates to a process for steam cracking a hydrocarbon feedstock using infrared radiation.

11 Claims, No Drawings

METHOD FOR STEAM CRACKING

CROSS-REFERENCE TO RELATED APPLICATIONS

This application is US National Stage of International Patent Application PCT/EP2020/069324, filed Jul. 9, 2020, the contents of which are incorporated herein by reference.

INTRODUCTION

The present application relates to a furnace for steam cracking a hydrocarbon feedstock, and a process for steam cracking a hydrocarbon feedstock to produce olefins using, to the largest extent, electrically powered equipment where the power is obtained from renewable sources or low-carbon sources.

Global warming and climate change caused by human emissions of greenhouse gases have become a major concern to the public. Major policy initiatives such as the Paris Climate Agreement of 2017 and the European Green deal of 2019 are demanding actions to reduce on those emissions from all sectors in society, including the chemical industry.

The chemical industry is a major source of greenhouse gas emissions, via the generation of energy required for its conversions through combustion, via emission of co-products, or via end-of-life incineration of its products.

One particular large greenhouse gas emission source is concentrated in a few large-scale processes carried out at high temperatures (above 500° C.), which require external heating by combustion of fossil hydrocarbons. Examples are steam cracking (the production of light olefins from crude oil, distillates like naphtha, or gases like ethane, propane and butane), catalytic cracking (production of light components for fuel or feedstock use from heavy petroleum fractions), and methane steam reforming (making hydrogen and carbon monoxide or carbon dioxide from natural gas).

Conventional steam crackers are complex industrial facilities that can be divided into three main zones, each of which has several types of equipment with very specific functions: (i) the hot zone including: pyrolysis or cracking furnaces, quench exchanger and quench loop, the columns of the hot separation train (ii) the compression zone including: a cracked gas compressor, purification and separation columns, dryers and (iii) the cold zone including: the cold box, de-methaniser, fractionating columns of the cold separation train, the $C_2$ and $C_3$ converters, the gasoline hydro-stabilization reactor.

Conventional steam cracking is carried out in tubular reactors in direct-fired heaters (furnaces). Various tube sizes and configurations can be used, such as coiled tube, U-tube, or straight tube layouts. Tube diameters range from 1 to 4 inches. Each furnace consists of a convection zone in which the waste heat is recovered and a radiant zone in which pyrolysis takes place.

In order to reduce or even eliminate the greenhouse gas emissions from those processes, the use of renewable or low-carbon energy, and electricity in particular, to achieve these high temperatures will be a major step forward. This is not unheard of: many examples are known of industrial heating with electricity, for instance the use of arc furnaces to melt scrap metal or to produce phosphorus, or for tracing of pipelines. However, the ready availability and the low cost of fossil fuels in the petrochemical industry (where they are often a side stream from certain conversions) have kept electrical heating technologies from widespread use in large-scale installations.

The recent emphasis on greenhouse gas reductions have triggered research into such electrical heating methods. US20150321912 of BASF describes processes using among others electricity as heat source. The '912 publication relates to a method of carrying out heat-consuming processes, wherein the total energy required averaged over a year for the heat-consuming process originates from at least two different energy sources, where one of the energy sources is an electric energy source whose power varies in the range from 0 to 100% of the total power required, and three different energy modes can individually provide the total power required for the heat-consuming process: (i) exclusively electric energy, (ii) a mixture of electric energy and at least one further nonelectric energy source or (iii) exclusively nonelectric energy, where the changeover time in which the change from one energy mode to another energy mode is completed is not more than 30 minutes.

Linde (US20170130887) relates to the use of resistive electrical heating for a range of high-temperature processes, including steam cracking. It describes a device for heating a fluid, including at least one electrically conductive pipeline for accommodating the fluid, and at least one voltage source connected to a respective pipeline. The voltage source is designed to generate an electric current in the connected pipeline which heats the pipeline in order to heat the fluid.

EP3249027 and EP3249028 patents envisage that at least one of the tubular reactors will be heated both by using combustion heat generated by burning at least one fuel and by using electrical heat generated by electrical energy.

US20180243711 (Haldor Topsoe) describes the use of inductive electrical heating for many high-temperature processes, e.g. steam methane reforming. It relates to a reactor system for carrying out an endothermic catalytic chemical reaction in a given temperature range upon bringing a reactant into contact with a catalyst material. The reactor system includes a reactor unit arranged to accommodate catalyst material including one or more ferromagnetic macroscopic supports susceptible for induction heating where the one or more ferromagnetic macroscopic supports are ferromagnetic at temperatures up to an upper limit of the given temperature range. The one or more ferromagnetic macroscopic supports are coated with an oxide, and the oxide is impregnated with catalytically active particles. The reactor system moreover includes an induction coil arranged to be powered by a power source supplying alternating current and being positioned so as to generate an alternating magnetic field within the reactor unit upon energization by the power source, whereby the catalyst material is heated to a temperature within the temperature range by the alternating magnetic field.

WO2016001476 (Coolbrook) describes a shock wave reactor for thermal cracking of hydrocarbon-containing feedstock.

Whereas all this documentation is evidence for a heightened interest in greenhouse-gas-free high-temperature processes, none of those have been implemented or demonstrated on industrial scale in the steam cracking process.

DETAILED DESCRIPTION

The process of steam cracking of hydrocarbons is one of the largest processes carried out by the chemical industry in Europe. It is the major source of ethylene, the largest chemical intermediate. It is applied on feedstocks such a crude oil, naphtha or gases like ethane, propane and butane. Total volume of ethylene is more than 150 million ton per annum, total output of products is double that, and greenhouse gas emission is more than 200 million ton per annum. The process consists of rapid heating to 750-900° C. of a preheated vapor stream, maintaining exposure to those temperatures for a fraction of a second, followed by rapid cooling. Part of the heat ends up in the higher energy content of the products. The sensible and latent heat is typically recovered and used for other processes, and ultimately ends up dissipated to the environment.

All heating steps are done by combustion of hydrocarbon gas, typically coproduct gas that cannot be used otherwise. The heat is generated by combustion in furnaces and transferred to the hydrocarbon substrate in a so-called firebox. The external flames heat the multiple metallic tubes by essentially radiation whereas the still hot flue gases, leaving the radiation zone, preheat the feedstock and dilution steam in the convection section through heat-exchange bundles.

In other words: current steam crackers rely to a large extent on energy transfer by infrared radiation (Heynderickx, G. J. et al., Banded gas and non-gray surface radiation models for high emissivity coatings. AIChE journal, 2005; Stijn Vangaever et al., Computational Fluid Dynamics-Based Study of a High Emissivity Coil Coating in an Industrial Steam Cracker, Industrial & Engineering Chemistry Research 2018 57 (49), 16782-16794).

Over 90% of the heat transfer in a steam cracking furnace to the reactor coils arises from radiation. The heat flux from furnace to the cracking tubes varies along the tube length between 120 and 30 kW/m2 (Å. Scholand, Heat transfer in the radiation section of chemical tube reactors, I. Chem. E. Symposium Series NO. 78; K. M. Van Geem, Effect of Radial Temperature Profiles on Yields in Steam Cracking, AIChE Journal 173 January 2004 Vol. 50, p. 173).

Heat transfer through radiation takes place in form of electromagnetic waves mainly in the infrared region. In the context of this document, infrared radiation is defined as electromagnetic radiation with wavelength between 700 nanometer and 1 millimeter and are termed short-wave, medium-wave or long-wave. Infrared energy travels at the speed of light without heating the air it passes through, (the amount of infrared radiation absorbed by carbon dioxide, water vapor and other particles in the air typically is negligible) and gets absorbed or reflected by objects it strikes. A black body is a hypothetical body that completely absorbs all wavelengths of thermal radiation incident on it and do not reflect light (perfect emitter and absorber of radiation). When heating black bodies to a given temperature, they emit thermal radiation. The radiation energy per unit time from a black body is proportional to the fourth power of the absolute temperature and can be expressed with Stefan-Boltzmann Law. Perfect black bodies do not exist, but real bodies approach them and incident radiation (also called irradiation) is partly reflected, absorbed or transmitted. The Stefan-Boltzmann Law for non-ideal black or grey bodies is:

The total power density of a radiating surface is proportional to the fourth power of the surface temperature:

$$P=\varepsilon\sigma T^4$$

where

P=heat transfer per unit time and per surface area (W/m$^2$)
$\sigma$=5.6703 10-8 (W/m$^2$K$^4$)—The Stefan-Boltzmann Constant
T=absolute temperature in kelvins (K)
A=area of the emitting body (m$^2$)
$\varepsilon$=emissivity coefficient of the object (one—1—for a black body)

The heat flux (W/m$^2$) can be derived from this formula.

Embodiments of the present application concern an alternative heating method. The embodiments of the present application thus provide a furnace for steam cracking according to claim 1.

Embodiments of the present application thus use an electrically heated infrared emitter (or radiator). Infrared radiation is produced by any "warm" surface and the primary source can be anything that causes a substrate's temperature to increase, from the metabolic process in a living organism to external radiation from the sun. One of those mechanisms is heating by electric current passing through a conductor, generating temperature increase by resistive heating. Such currents can for instance be generated by applying an electric potential difference over the conductor, or by induction. Also dipole interaction with electromagnetic fields is a way to heat up substrates so that they become sources of infrared radiation.

Practically, electric infrared is produced by Joule-heating the emitter. All emitters generate radiation over the wavelength spectrum in a bell-shaped distribution. The temperature of an emitter determines its peak wavelength: the higher the emitter temperature, the shorter the peak wavelength and higher the intensity.

When radiant energy impinges on an object, it can either be absorbed or reflected, or transmitted by that object. The amount of absorption, reflection, or transmission is affected by the wavelength of the radiant energy and the physical and surface properties of the object and only absorbed energy will contribute to the heating of the product. The amount of energy an object absorbs can be controlled by selecting the proper emission wavelength.

The three different wavelengths into which IR is typically divided are:

Short wavelength IR is intense and has the greatest penetration depending on the material being radiated. This type of radiation is emitted over a band extending from 0.76 µm to 2.8 µm and from emitters operating at temperatures in the range of 1000-2200° C. Short wave radiation source converts up to 90% or more of the electricity into infrared radiation.

Medium-wave IR comes from emitters operating at temperatures in the range of 700-1000° C. and generally peaks in the range of 2.3 µm to 3 µm.

Long wavelength IR provides the shallowest penetration of the three types and is emitted at temperatures from 300-700° C. Peak intensity occurs over a range extending from 3 µm to 5 µm.

Electrical infrared emitters exist in a multiplicity of designs. The most common designs are lamps, tubes, and panels (typically flat), scallops (concave or convex) or rods.

The net radiative heat transfer from one surface 1 to another 2 is the radiation leaving the first surface for the other minus that arriving from the second surface and is for a grey body equal to:

$$Q_{1\to 2}=\varepsilon'\sigma A_1 F_{1\to 2}(T_1^4-T_2^4)$$

with $A_1$: surface area of the emitter and $A_2$ surface area of receiver $F_{1\to 2}$: the view factor from surface 1 to surface 2 with $F_{2\to 1}=(A_1/A_2) F_{1\to 2}$ $\varepsilon'$=generalised emissivity coefficient (taking into account the material characteristics of the emitter, $\varepsilon_1$, $A_1$ as well as those of the receiving object, $\varepsilon_2$, $A_2$ and the geometric arrangement).

The light from infrared emitters propagates in straight lines and is generally emitted in all directions. Reflectors can be used to focus the infrared radiation optimally on the receiving tubes, transporting the hydrocarbon feedstock and dilution steam that must be heated.

Infrared heating is well-known for many applications, domestic and industrial, such as of heaters for outdoor terraces, the red-hot wires in bread toasters, and the heating elements in electric ovens. Well-known electric infrared radiators typically take the shape of resistively heated metallic (including alloys), intermetallic or ceramic (including cermets) conductors that either emit directly from their surface (compare the use in electric household ovens or bread toasters), from an indirectly heated ceramic material, or through a quartz wall. Very high temperatures can be achieved with well-chosen materials. Especially ceramic emitters can be designed for optimal heat transfer.

The present application further provides additional embodiments according to the exemplary aspects.

As mentioned, in embodiments of the present application, the hydrocarbon feedstock is fed to multiple tubes in the furnaces. These tubes are sometimes also referred to as coils, or radiant coils. While in the furnace the hydrocarbon feedstock is heated rapidly to a temperature above 650° C. resulting in cracking of at least a part of the hydrocarbon feedstock to obtain olefins. The hydrocarbon feedstock exits the furnace through the tubes and is then rapidly cooled (quenched).

The setup of the furnace can be the same as a conventional combustion furnace. The present application provides that part or all of the conventional burners, using fuel gas, can be replaced by the electrically heated infrared emitter. As no combustion gases are produced, no convection occurs and no heat recovery is required. Optionally, however, convection could be applied additionally to further improve homogenous heating by circulating an inert gas.

The electrically heated infrared emitter can be a known system. An important requirement is that the electrical infrared heating sours is capable of heat transfer such that the hydrocarbon feedstock can be heated to temperatures of 650° C. or higher, up to 750° C. or even 950° C. The electrically heated infrared emitter itself may have any elevated temperature (1000 to 3000° C. for instance), as long as the heat duty is delivered through a combination of surface area and temperature. The electrically heated infrared emitter may also emit other electromagnetic radiation (e.g. visible light) that could contribute to the energy transfer to an absorptive tube (which should be preferably optimized for maximum radiation absorption).

For that temperature range electrically powered infrared radiation generators are known. German firm Rauschert offers ceramic heaters with element temperatures up to 1000° C. Indian companies Kerone and Ace offers ceramic heaters with power densities up to 77 kW/m2, 1 kW per unit and temperatures up to 900° C. Other companies include US companies Tempco, Watlow and Protherm. Especially interesting is German firm Bach RC, offering silicon nitride and aluminium nitride heaters for use up to 1000° C. and 150 W/cm2 (1500 kW/m2).

Surprisingly, in the pursuit of electrical methods to provide energy to a steam cracking device, nobody has ever mentioned the concept of using electrically powered infrared radiation sources for the purpose of steam cracking, by heating the outside of the tubes containing the hydrocarbon feedstock, without producing hot combustion gases that need to be used to recover its contained sensible heat.

Embodiments of the present application replace a hydrocarbon, $CO_2$ emitting energy source by electrical power. The electrical power is preferably from a renewable energy or low-carbon source.

Renewable energy refers to energy from natural sources or processes that are constantly replenished on a human timescale, such as sunlight, wind, rain, tides, waves, hydropower and geothermal heat.

Low-carbon energy source refers to energy from processes or technologies that produce power with substantially lower amounts of carbon dioxide emissions than from conventional fossil fuel power generation. It includes low carbon power generation sources such as wind power, solar power, hydropower and nuclear power. The term largely excludes conventional fossil fuel sources.

The process(es) of the present application is/are particularly advantageous in that the electrically powered heat sources can use electricity originating from renewable or low-carbon energy. In this case, the process leads to less emission of CO2 than a conventional steam cracking process. A possible definition of renewable or low-carbon electricity lies in the quantity of CO2 that is emitted to produce it. Some general value of the quantity of CO2 emitted during the production of electricity can be found in documents such as Koffi, Brigitte; Cerutti, Alessandro; Duerr, Marlene; Iancu, Andreea; Kona, Albana; Janssens-Maenhout, Greet (2017): CoM Default Emission Factors for the Member States of the European Union—Version 2017, European Commission, Joint Research Centre (JRC) [Dataset]. Such document can be downloaded at: http://data.europa.eu/89h/jrc-com-ef-comw-ef-2017.

As a proposed definition of renewable or low-carbon electricity, it is considered that electricity produced with a standard emission factor of less than 0.2 ton CO2 per MWh electricity is renewable or low-carbon electricity, preferably less than 0.1 ton CO2/MWh or most preferably less than 0.05 ton CO2/MWh. The standard emission factors are the emissions taking place due to consumption of energy carriers using the standard approach, i.e. by applying IPCC "standard" emission factors in line with IPCC principles for stationary combustion of the energy carriers. For clarity, other greenhouse gases like methane and nitrogen oxides are not accounted for in these standard emission factors. Also emissions related to the supply of the energy carriers are not accounted for in these emission factors as they can vary a lot according to regions and over time. By way of example, power generation from fossil resources emits the following amounts of $CO_2$: 320-330 kg $CO_2$/MWh emissions from the highest efficiency combined-cycle gas turbine (CCGT) plants, 500-520 kg $CO_2$/MWh for modern open-cycle gas turbine (OCGT) plants, and 750-800 kg $CO_2$/MWh for a modern supercritical coal-fired power plant whereas nuclear energy plants, geothermal, photovoltaic, hydropower and wind turbines emit 0 kg $CO_2$/MWh.

The technology also offers additional advantages over conventional heating technology, including but not limited to:

Infrared heating can be started, switched off and adjusted within seconds, much easier than open-fire-heated furnaces.

Electrically powered infrared heating allows variation of temperature between tubes and across the reactor tube length to achieve any desirable heating profile.

Electrically-powered infrared heating completely avoids the loss of heat from the system in the form of hot flue gases, and the complicated process steps to recover that heat for re-use (and inevitable loss).

Infrared heating may also allow for better furnace design because an infrared heating system decouples the heat generation and the containment functions of reactor tubes, enabling separate optimization.

An infrared heating system also stays close to current furnace design, potentially even allowing modification of existing assets as opposed to building completely new ones.

Infrared heating devices may be placed around the reactor tubes in a more optimised and concise manner and hence reducing the size of steam cracking furnaces.

The feedstock for the present process can be ethane, liquefied petroleum gas, naphtha or gasoils. Liquefied petroleum gas (LPG) consists essentially of propane and butanes. Petroleum naphtha or naphtha is defined as the hydrocarbons fraction of petroleum having a boiling point from 15° C. up to 200° C. It consists of a complex mixture of linear and branched paraffins (single and multi-branched), cyclic paraffins and aromatics having carbons numbers ranging from 5 to about 11 carbons atoms. Light naphtha has a boiling range from 15 to 90° C., consisting of C5 to C6 hydrocarbons while heavy naphtha has a boiling range from 90 to 200° C., consisting of C7 to about C11 hydrocarbons. Gasoils have a boiling range from about 200 to 350° C., consisting of C10 to C22 hydrocarbons, including essentially linear and branched paraffins, cyclic paraffins and aromatics (including mono-, naphtho- and poly-aromatic). Heavier gasoils (like atmospheric gasoil, vacuum gasoil, atmospheric residua and vacuum residua), having boiling ranges above 300° C. and C20+ hydrocarbons including essentially linear and branched paraffins, cyclic paraffins and aromatics (including mono-, naphtho- and poly-aromatic) are available from atmospheric or vacuum distillations units.

In particular, the cracking products obtained in the present process may include ethylene, propylene and benzene, and optionally hydrogen, toluene, xylenes, and 1,3-butadiene.

In embodiments, the outlet temperature of the reactor may range from 800 to 1200° C., from 820 to 1100° C., from 830 to 950° C., from 840° C. to 920° C. The outlet temperature may influence the content of high value chemicals in the cracking products produced by the present process.

In embodiments, the residence time of the feedstock, through the radiation section of the reactor where the temperature may be between 650 and 1200° C., may range from 0.005 to 0.5 seconds, or from 0.01 to 0.4 seconds. In some embodiments, the temperature may be greater than 750° C. In some embodiments, the temperature may be greater than 950° C.

In embodiments, the electrically powered heating elements produce a radiation heat flux of at least 20000 $W/m^2$. In some embodiments the electrically powered heating elements produce a radiation heat flux of at least 40000 $W/m^2$. In some embodiments the electrically powered heating elements produce a radiation heat flux of at least 50000 $W/m^2$.

In embodiments, steam cracking said feedstock is done in presence of dilution steam in a ratio of 0.1 to 1.0 kg steam per kg of hydrocarbon feedstock, from 0.25 to 0.7 kg steam per kg of hydrocarbon feedstock, or 0.35 kg steam per kg of feedstock mixture, to obtain cracking products as defined above.

In embodiments, the reactor outlet pressure may range from 500 to 1500 mbars, from 700 to 1000 mbars, or may be approx. 850 mbars. The residence time of the feed in the reactor and the temperature are to be considered together. A lower operating pressure may result in easier light olefins formation and reduced coke formation. The lowest pressure possible may be accomplished by (i) maintaining the output pressure of the reactor as close as possible to atmospheric pressure at the suction of the cracked gas compressor (ii) reducing the partial pressure of the hydrocarbons by dilution with steam (which has a substantial influence on slowing down coke formation). The steam/feedstock ratio may be maintained at a level sufficient to limit coke formation.

Effluent from the pyrolysis furnaces may contain unreacted feedstock, desired olefins (mainly ethylene and propylene), hydrogen, methane, a mixture of $C_4$'s (primarily isobutylene and butadiene), pyrolysis gasoline (aromatics in the $C_6$ to $C_8$ range), ethane, propane, di-olefins (acetylene, methyl acetylene, propadiene), and heavier hydrocarbons that boil in the temperature range of fuel oil (pyrolysis fuel oil). This cracked gas may be rapidly quenched to 338-510° C. to stop the pyrolysis reactions, minimize consecutive reactions and to recover the sensible heat in the gas by generating high-pressure steam in parallel transfer-line heat exchangers (TLE's). In gaseous feedstock-based plants, the TLE-quenched gas stream may flow forward to a direct water quench tower, where the gas is cooled further with recirculating cold water. In liquid feedstock-based plants, a prefractionator may precede the water quench tower to condense and separate the fuel oil fraction from the cracked gas. In both types of plants, the major portions of the dilution steam and heavy gasoline in the cracked gas may be condensed in the water quench tower at 35-40° C. The water-quench gas is subsequently compressed to about 25-35 Bars in 4 or 5 stages. Between compression stages, the condensed water and light gasoline may be removed, and the cracked gas is washed with a caustic solution or with a regenerative amine solution, followed by a caustic solution, to remove acid gases ($CO_2$, $H_2S$ and $SO_2$). The compressed cracked gas may be dried with a desiccant and cooled with propylene and ethylene refrigerants to cryogenic temperatures for the subsequent product fractionation: front-end demethanization, front-end depropanization or front-end deethanization.

The invention claimed is:

1. A process for steam cracking a hydrocarbon feedstock to produce olefins, comprising:
   feeding a hydrocarbon feedstock and dilution steam to one or more tubes in a furnace for steam cracking a hydrocarbon feedstock,
      wherein the furnace comprises one or more tubes for transporting the hydrocarbon feedstock and dilution steam, and an electrically heated infrared emitter for transferring heat to the tubes,
      wherein the electrically infrared emitter has a design selected from the group consisting of lamps, tubes, panels, scallops and rods,
      wherein said electrically heated infrared emitter is powered by electricity from a renewable or low-carbon energy source,
      wherein said renewable or low-carbon energy source is produced with a standard emission factor of less than 0.2 ton CO2 per MWh electricity; and
   exposing the hydrocarbon feedstock and dilution steam in the one or more tubes to infrared radiation to crack at least a portion of the hydrocarbon feedstock,
   wherein sensible or latent heat of effluent exiting the furnace is extracted at least partially by means of one or more heat exchangers and used to at least partially preheat the hydrocarbon feedstock, dilution steam or mixture thereof, and
   wherein the electrically heated infrared emitter is configured as an annular shell around the tubes for transporting the hydrocarbon feedstock and dilution steam.

2. The process of claim 1, wherein the electrically heated infrared emitter generates sufficient heat such that the hydrocarbon feedstock and dilution steam is heated in the tubes to a temperature of at least 650° C.

3. The process of claim 1, wherein the electrically heated infrared emitter comprises one or more electrically powered heating elements.

4. The process of claim 3, wherein the electrically powered heating elements produce a radiation heat flux of 20000 W/m$^2$ or more.

5. The process of claim 3, wherein the electrically powered heating elements are ceramic heating elements.

6. The process of claim 3, wherein the electrically powered heating elements are quartz heaters, comprising a heating element in a quartz tube.

7. The process of claim 3, wherein the electrically powered heating elements are metal or metal alloy heating elements.

8. The process according to claim 1, wherein the renewable or low-carbon energy source is produced with the standard emission factor of less than 0.1 ton CO2/MWh electricity.

9. The process according to claim 1, wherein the one or more tubes in the cracking furnace are coated with an infrared receiving material or wherein the one or more tubes in a cracking furnace are made of infrared receiving material.

10. The process according to claim 1, wherein the hydrocarbon feedstock comprises one or more hydrocarbons having at least two carbon atoms.

11. The process according to claim 1, wherein the transfer of heat to the hydrocarbon feedstock and of the dilution steam is carried out separately in at least two pipes before mixing two streams; or wherein the hydrocarbon feedstock and the dilution steam are mixed, followed by transfer of heat to the mixture; or wherein the transfer of heat to the hydrocarbon feedstock and the dilution steam is carried out separately in at least two pipes to a temperature less than 500° C., followed by mixing the two streams and further transferring heat to the mixture.

* * * * *